2 Sheets—Sheet 1.
S. STENBERG.
MANUFACTURE OF SUGAR AND ALCOHOL FROM LICHENS.
No. 101,783. Patented Apr. 12, 1870.
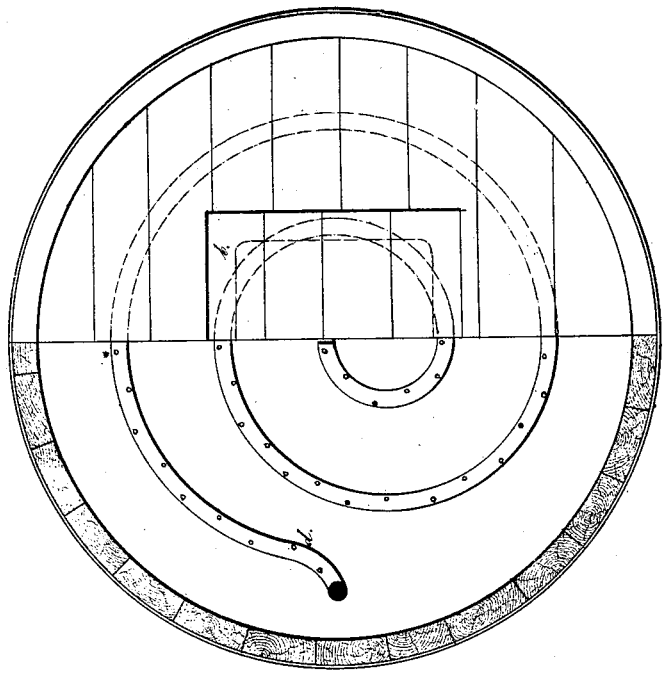
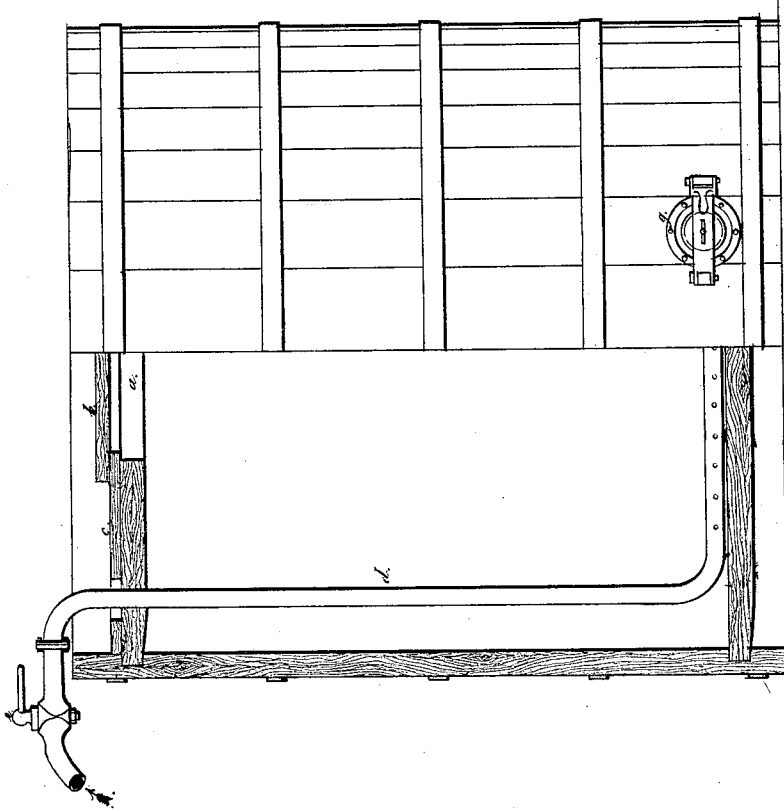

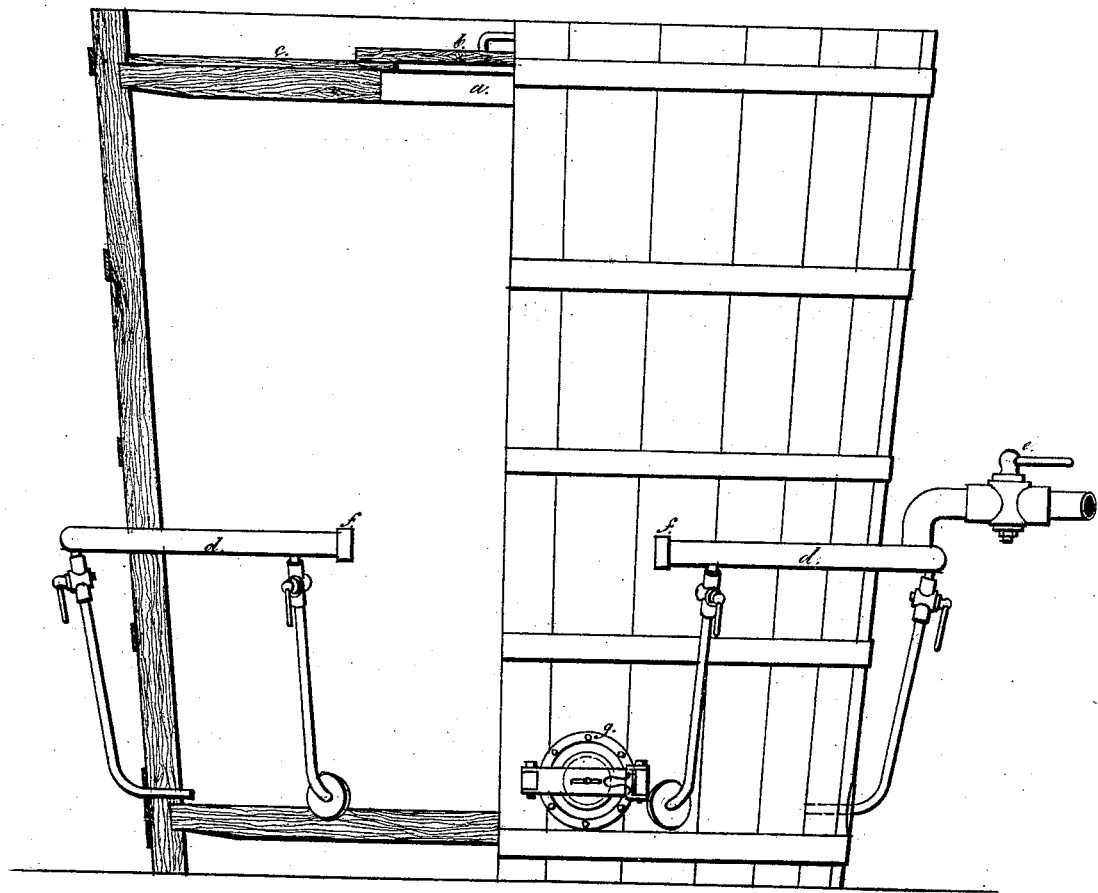

United States Patent Office.

STEN STENBERG, OF STOCKHOLM, SWEDEN.

Letters Patent No. 101,783, dated April 12, 1870.

---

IMPROVEMENT IN THE MANUFACTURE OF SUGAR AND ALCOHOL FROM LICHENS.

---

The Schedule referred to in these Letters Patent and making part of the same

---

*To all whom it may concern:*

Be it known that I, STEN STENBERG, of Stockholm, in the Kingdom of Sweden, have discovered a new and useful Employment of Lichens as a Material for the Profitable Fabrication of Grape-Sugar and Alcohol, resting upon certain properties of the cellular tissue of the lichens discovered by me, and that I have invented a process and apparatus for the fabrication of the same; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use this discovery, I will proceed to describe it.

It has long been known that the cellular tissue of plants, by being cooked with certain diluted acids, may be changed into starch-gum or dextrine, and finally into grape-sugar, of which, by the usual methods, alcohol may be obtained. It has also been tried to turn this property of the cellular tissue to practical use in the manufacture of alcohol; but these attempts have not hitherto met with the intended success, for it was found that the amount of alcohol obtained by this manner did not compensate for the cost and trouble which were expended in its production.

It has been a discovery of the undersigned that the cellular tissue of the cryptogama, which are comprised under the general name of lichens, differs from the common cellular tissue, among other things, in this respect, that upon being boiled with diluted acids it is changed much more easily and more completely into grape-sugar than the latter, so that even of those lichens which contain little or no starch, without any difficulty and with but a small expenditure of acid, there may be obtained from sixty-five to seventy per cent. sugar from one hundred parts of the dried lichen. This property of the lichens has not been noticed before me; and in the lichen I have consequently discovered a most important material for the production of grape-sugar and alcohol.

The discovery of this property of the lichens is the first specification for which I desire to have Letters Patent in the United States.

The second specification refers to the boiling of the lichens with diluted acids, in order to change its cellular tissue into grape-sugar. These acids have been used before in turning the cellular tissue of the plants, especially that of trees, in the form of sawdust, into grape-sugar; but I hold that I have been the first who applied diluted acids to the cellular tissue of the lichens for the practical manufacture of grape-sugar and alcohol.

In this my second specification I, therefore, apply for Letters Patent for the application of diluted acids to the cellular tissue of lichens, for the practical manufacture of grape-sugar and alcohol.

The third specification relates to the means and the instruments by which this boiling is effected. This is done by steam. And in order to apply the steam in the most economical and thorough manner, I invented two boiling-vats, for the construction of which I likewise apply for Letters Patent in the United States. Drawings of these two vats accompany this specification. In these vats the lichen is exposed to the action of the acids. These vats are simple in construction. They are made of wood, after the manner of large tubs, and are provided with strong iron hoops.

Figure 1 exhibits such a vat in a cylindrical form, and

Figure 2, in one which is slightly conical.

$a$ is an opening in the upper bottom of the vat, through which the lichen and the acid are introduced into the vat, and through which the mass may be stirred from time to time.

$b$ is a loose lid by which the opening may be closed.

$c$ is a covering of loose planks over the whole upper bottom. This covering projects somewhat over the opening of the solid bottom, in order that, by the same, the opening in the bottom may be protected against the wear and tear of the pole which is used in stirring and working the mass in the vat. This planking can be easily removed when it is worn out.

$d$ is a pipe through which the steam is admitted into the vat, and $f$ is a cock in the same.

This pipe may be of lead or copper, and is made best with an interior diameter of forty millimeters, about two inches. It leads into the interior of the vat, immediately over the lower bottom, and must be so constructed that the steam is by the same distributed uniformly over the whole lower bottom of the vat, as in fig. 1, and the steam escapes in a large number of small holes, with which the pipe is provided; or else, as in fig. 2, the pipe encompasses the vat on the outside, and at even intervals about six smaller pipes, with a diameter of from eight to ten millimeters, or four-fifths inch, are introduced into the interior of the vat, immediately over its lower bottom, extending a few centimeters into the interior.

$f$ is a part which may be unscrewed in order to allow the pipe to be cleansed, in case this is found necessary.

The second arrangement has this advantage over the first, that the pipe is not stopped up by particles of the lichen or by impurities, and is better protected against the acid mass in the interior of the boiler.

$g$ is a stopper of the opening, through which the contents of the vat may be emptied.

When these vats are made with a diameter of 1.8 meter, and the same distance extends between the upper and lower bottoms, they will hold 4,600 liters, and it is calculated that 700 kilograms or 1,405 pounds of lichen may be used at one cooking.

The fourth specification relates to the process of boiling by which the cellular tissue of the lichen is changed into sugar. For this process, by which this boiling is effected in the quickest and most economical way, I likewise apply for Letters of Patent in the United States.

It is of importance that the volume of water with which the acid is diluted at the outset be properly determined, and great care must be taken not to put in too much water, for if the acid is too much diluted, the formation of sugar remains imperfect, no matter how long you may boil the mass. From 700 to 800 liters of water = 135 to 150 gallons, may be added to 40 liters = 7½ gallons, of muriatic acid, 1.165 sp. w. When sulphuric acid is used, and this is calculated according to its volume, it can be diluted much more than muriatic acid. Still, the above proportion of acid and water cannot be retained under all circumstances. For, as it is of the first importance that all parts of the lichen should come into contact with the acid before this is diluted too much by the condensation of the steam, therefore the quantity of water must be lessened in the beginning in proportion to the rapidity with which the steam is condensed in the boiler by the cold without.

If the lichen which is used is very moist, the water which is already contained in it must also be taken into consideration in determining the quantity of water with which the acid is to be diluted. To every 100 parts of lichen, by weight, there must be added, while boiling, from 8 to 10 parts of undiluted acid, also by weight.

When the amount of acid to be used is properly diluted with water and poured into the boiler, the steam is turned on, and a beginning may be made with filling in the lichen after it has been duly weighed. The boiler is crammed full with lichen, which is pressed down against the bottom of the vat with a lever, and occasionally stirred about with it.

While the lichen is being filled in, the steam must be partially turned off, so that the workman whose business it is to fill in the moss is not incommoded by the escaping steam, which may be carried off by a funnel which is constructed over and around the boiler. But while the mass of the lichen is stirred in the boiler, it is best to turn off the steam altogether.

In proportion as the lower layers of the mass of lichen are acted upon by the acid they collapse, and the boiler can be filled up again with a fresh addition of lichen. In this manner the boiling is continued until the whole amount of the lichen which was weighed off is filled into the boiler.

When a large quantity of lichen is to be boiled, it is best not to pour in the whole of the acid at once, but to reserve a portion, and to add it gradually as the lichen is being filled in.

The amount of diluted acid contained in the boiler is from the very first so insignificant that it seems almost impossible that such a small quantity of acidulous liquors, together with the water obtained by the condensing of the steam in the boiler afterward, should be sufficient to absorb the voluminous lichens, and dissolve the whole of what has been weighed out for it. Nevertheless, the result is brought about by the above process.

If, after the last filling in of the lichen, the mass is pressed from time to time against the bottom of the boiler and stirred about, under the action of the acid and the steam, it gradually collapses into a small compass, and after a few hours' time there is finally formed a thick, homogeneous broth. Nevertheless, the formation of sugar is not yet completed. For this purpose a few hours' additional boiling is still required. The formation of sugar cannot be considered as completed except when a specimen of the boiled mass, after being triturated in a little mortar with water, and after being poured upon a filter, leaves a residuum which, upon being dripped into strong spirit, does not form any undissolved flakes of dextrine or other similar substance. About eight or nine hours are required for the purpose, counting the time from the beginning, when the first layer of lichen is put into the boiler. After cooling it frequently has the consistency of a very solid, perfectly homogeneous mass of jelly.

In case it is not desired to work up this sacchariferous and acidulous mass of lichen jelly at once, it can be easily stored up for a long time in wooden reservoirs, furnished with lids, without any danger of its spoiling.

The sacchariferous mass obtained by the above-named process from lichen furnishes a most valuable material for the production of alcohol, and in case sulphuric acid is used in its preparation, it can, of course, also be used for the manufacture of grape-sugar or grape-sugar sirup, according to the usual method. But it is most advantageous to work up the whole mass at once into alcohol.

The fifth specification for which I desire to obtain a patent in the United States, is the process according to which alcohol is generated from the above-named lichen jelly. For this purpose the jelly is first diluted in a large vat with warm water, and afterward the free acid in this solution is removed by an appropriate and cheap neutralizing agent, viz, ground and prepared chalk. Before this is added to the acidulous mash, it must be stirred up with water, and of the chalky liquor obtained in this manner, small portions are added from time to time to the mash, while this is diligently stirred.

It is always necessary to use a larger amount of chalk for neutralizing the mash than is required by the theoretical computation, for otherwise the neutralizing would either occupy too much time, or else it would remain incomplete. For neutralizing a mash which is obtained of 700 kilograms of lichen and 46 kilograms of muriatic acid, of 1.165 sp. w., I usually use from 38 to 40 kilograms of chalk. A surplus of chalk, though it should remain in the mash, is not injurious, nor is the chloride of calcium, which is formed by the neutralization, nor, finally, the precipitated gypsum, in case sulphuric acid is used. After the neutralization is completed, the mash must react faintly acid upon litmus-paper.

The mash is now suffered to cool off in a cooling-tank, and is still further diluted. After its temperature has been lowered to 30° or 32° Cels., it is transferred to the fermenting-vat, and is there brought into a state of fermentation by the usual artificial yeast, made of malt and rye-meal. A mash of 700 kilograms of lichen must be so far diluted that its volume reaches about 5,000 liters. If the mash ferments in a more concentrated condition, less alcohol is obtained than when it is properly diluted.

The temperature in the room where the fermentation is carried on must be from 15° to 20°, for then the fermentation is rendered more complete, and the yield of alcohol is greater than when the temperature is lower.

To 100 parts of lichen, by weight, are added about 8 parts of dry yeast materials. Four days are usually taken up by the fermentation of the mash. After the mash is done fermenting, the alcohol which is thus formed is distilled in the usual way.

Of 8.5 kilograms of dry lichen there are obtained, by the method described above, 5.24 liters of spirit, containing 50 per cent. of alcohol.

What I claim as my discovery and invention is—

1. The employment of lichens as described for the property of being more easily and more completely turned into grape-sugar than any other cellular tissue of plants.

2. The application of diluted acids to the cellular tissue of lichens, for the practical manufacture of grape-sugar and alcohol.

3. The boiling-vats in which the lichens are boiled with diluted acids.

4. The process by which the lichen is changed into sacchariferous jelly.

5. The process by which alcohol is obtained from this sacchariferous jelly.

Stockholm, October 4, 1869.

STEN STENBERG.

Witnesses:
 NEV A. ERFWING,
 WM. AUBIGNÉ.